Oct. 7, 1930.   W. RIESELER ET AL   1,777,678
FLYING MACHINE
Filed Jan. 8, 1927
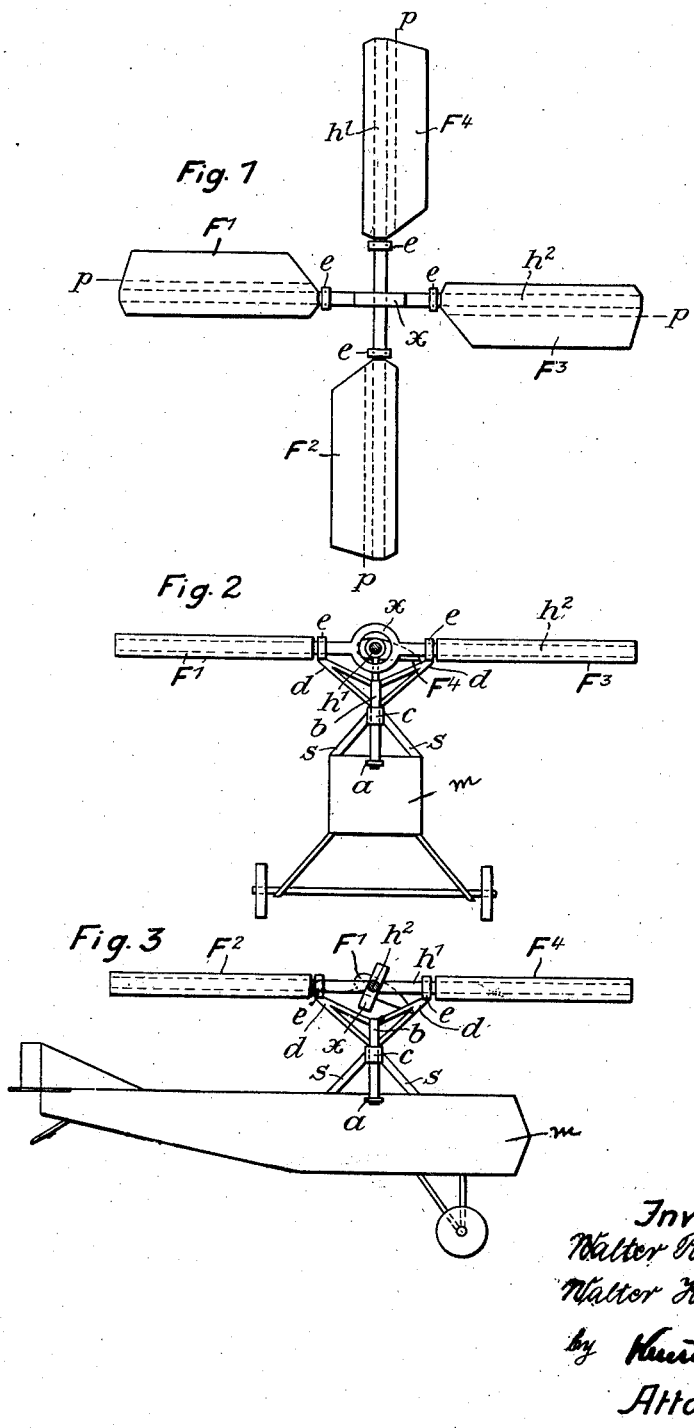
Inventor:
Walter Rieseler
Walter Kreiser
by
Attorney.

Patented Oct. 7, 1930

1,777,678

UNITED STATES PATENT OFFICE

WALTER RIESELER AND WALTER KREISER, OF BERLIN-JOHANNISTHAL, GERMANY, ASSIGNORS TO E. BURKE WILFORD, OF MERION, PENNSYLVANIA

FLYING MACHINE REISSUED

Application filed January 8, 1927. Serial No. 159,848, and in Germany January 23, 1926.

Our invention relates to aircraft and more particularly to aircraft provided with aerodynamically rotated wings, generically designated as autogyro.

It is an object of our invention to provide means whereby the lack of lateral equilibrium normally resulting from the operation of such wings is obviated. Although it is old to provide aircraft with wings fixed to a vertical axis with the wings arranged radially of the axis in the manner of a windmill wheel, and although such fixed winged devices can be caused to rotate by aerodynamic action, the aircraft associated with the rotating fixed wings is not in inherent lateral equilibrium owing to the differential lift derived from diametrically opposite wings of the sustaining element. Such differential lift causes a tilting moment which, in the fixed wing type of gyro, cannot be compensated for except by tilting the entire craft through a suitable angle, which is in general not practical because it would destroy the vertical equilibrium. This undesirable characteristic is incident to the fact that on one side of the aircraft the velocity of propulsion of the aircraft is added to the velocity of the rotation of wings, while on the other side of the aircraft it must be subtracted therefrom and the wings on the two sides are therefore operating under different conditions, and therefore have different effective lift components.

The creation of such differential lift and the attendant absence of lateral equilibrium is avoided according to the present invention by arranging diametrically opposite wings for common angular adjustment about a horizontal axis by aerodynamic action. In practice, if four such wings are provided, which are arranged radially about a substantially vertical axis, these wings are combined in two pairs, each wing of a pair being mounted on a common supporting member, which is free to oscillate about its longitudinal axis so as to be capable of angular adjustment under aerodynamic action when the wings rotate about the vertical axis through reaction from the air. The wings are mounted on the supporting member in such a manner that this member is arranged with its axis in front of the center of pressure or center of lift of each wing of a pair. With this arrangement, if the aircraft moves into the wind, aerodynamic action starts the wings rotating about their common substantially vertical axis, and that wing of a pair of wings which has the greater resultant velocity, and also therefore a greater lift, will in consequence of the pressure acting on the center of pressure or center of lift of this wing cause it to swing on the horizontal axis of the supporting member so as to assume a smaller or a negative angle of incidence whereby its lift will be automatically reduced. Simultaneously the diametrically opposite wing of the pair, being rigidly connected to the wing thus adjusted and having a lower resultant velocity and therefore a smaller component of lift, is thereby swung on the horizontal axis to assume a greater angle of incidence and to effect a consequently greater lift whereby the difference in the lifts of the two wings of a pair is automatically compensated and is substantially equalized.

In the drawings forming part of this specification an aircraft embodying our invention is illustrated diametrically and illustratively.

In the drawings:

Fig. 1 is a plan view of the rotatable sustaining unit,

Fig. 2 is an end view of the aircraft with the rotatable wings in position therein, the support of one pair of wings being shown in cross-section, and Fig. 3 is a side elevation corresponding to Fig. 2.

Referring to the drawings, $m$ is the hull, body or fuselage of the craft, $s$ is the tightening stretch, $a$ is a bearing on the hull or fuselage, and $c$ is a similar bearing on the tightening stretch, $b$ is a rotatable support shown as a vertical shaft arranged for rotation in these bearings. $d$, $d$ are four bracket arms extending from the upper end of the shaft $b$, and $e$ are horizontal bearings, preferably anti-frictional bearings, mounted on the free ends of the bracket arms $d$. $h_1$ and $h_2$ are the two supports for the wings, $h_1$ being a shaft, spar, or supporting element through two diametrically opposed bearings e and supporting the wings $F_2$ and $F_4$, which are mounted thereon with their centres of lift to the rear of the axis of the support. Each wing is initially given a small positive angle of incidence.

The supporting shaft $h_2$ for the wings $F_1$ and $F_3$ which are arranged thereon as described with reference to the other two planes, is forked in the middle at $x$, embracing the supporting shaft $h_1$ with sufficient clearance or play to allow the supporting shaft $h_2$ to be oscillatably adjusted through a suitable angle in both directions before being stopped by the other support $h_1$. The wings are preferably formed with airfoil cross-section, as usual and may also be designated as bearing planes, planes, blades, or airfoils.

The operation of this arrangement is as follows:

When the aircraft is propelled by its propeller (not shown) or by other means, the wings will be set rotating, by the air, together with their supporting elements about their common vertical axis $b$.

During rotation, the wing which moves forward against the wind, with the wings rotating in the direction of the arrow, (the left hand wing $F_1$), will be imparted a greater lift than the wing $F_3$ on the other side, which is rigidly connected with it and which recedes in the direction of propulsion. The wing $F_1$, owing to its centre of lift $p$ being disposed to the rear of the axis of the supporting shaft, will be oscillatably adjusted to a smaller angle of incidence relative to the direction of flight, whereby the wing $F_3$, being forced to follow the angular movement of wing $F_1$, will be simultaneously adjusted so that its angle of incidence is increased. In this manner the differences of lift of two diametrically opposed wings, and danger of the aircraft tilting laterally is substantially avoided.

We wish it to be understood that we do not desire to be limited to the exact details of construction shown and described for obvious modifications will occur to a person skilled in the art.

We claim:

1. Aircraft of the autogyro type comprising a fuselage and two pairs of airfoils, the airfoils of each pair being rigidly connected on axes out of registry with the center of pressure of the respective airfoils each pair being independently oscillatably adjustable as a unit under aerodynamic action.

2. Aircraft of the autogyro type comprising a fuselage, a freely rotatable substantially vertical shaft rotatably mounted on said fuselage, two pairs of horizontal bearings on said shaft, and a pair of rigidly connected airfoils supported in each pair of bearings on longitudinal axes out of registry with the center of pressure of the respective airfoils for angular adjustment as a unit under aerodynamic action, the connection of one pair of airfoils extending across the line connecting the other pair.

3. Aircraft of the autogyro type comprising a fuselage, a freely rotatable element forming an axis of rotation extending from said fuselage, two pairs of bearings on said element the axial planes of which extend transversely to said element, a pair of shafts, each shaft being rotatably supported in one of said pairs of bearings, a connection on one of said shafts extending across to and permitting passage of the other shaft, and a pair of wings rigidly mounted on each shaft on opposite sides of the axis about which axis said shafts can rotate bodily under aerodynamic action.

4. Aircraft of the autogyro type comprising a fuselage, a freely rotatable element forming an axis of rotation extending from said fuselage, a bracket on said element having a bearing on either side thereof, the axis of said bearings extending transversely with respect to said element, a shaft rotatably carried in said bearings, and a pair of wings rigidly mounted on said shaft on opposite sides of the axis about which axis said shaft can rotate bodily under aerodynamic action.

5. An airplane sustaining element of the autogyro type including an aerodynamically rotatable support, a pair of arcuately spaced blades of airfoil section, each extending substantially radially of the support and pivoted on axes extending substantially longitudinally of and through the respective blades but with the greater area of each blade lying behind the radial axis when the leading edge is toward the direction of rotation of the support so that the centre of pressure of each blade is normally out of registry with the pivotal axis of said blade and behind that axis, and means operatively associated with each blade of the pair whereby the angle of incidence of each blade may be simultaneously varied by aerodynamic action.

6. In aircraft a freely rotatable sustaining element of the autogyro type, a shaft journaled on the element, airfoils rigidly mounted axially of and on the shaft and rotatable bodily with the shaft in a fixed path with the greatest area of each airfoil lying behind the axis of the shaft so that lifting pressure on either blade imposes torque on the shaft, each blade having initially a slight positive angle of incidence relative to the path of rotation and being so arranged that the positive angle of incidence of one airfoil is increased as the shaft responds to the torque imposed by the other blade as lifting pressure moves said other blades to decrease its positive angle of incidence toward a negative angle of incidence under aerodynamic action to equalize the effective lift of both airfoils.

7. In autogyros, an aerodynamically rotatable support, a pair of arcuately spaced blades of airfoil section each extending radially of the support and pivoted respectively on axes of oscillation extending substantially longitudinally of and through the respective blades but with each blade so disposed as to cause the center of lift of the blade to be rearwardly offset from the axis of oscillation of said blade, and means operatively associated with each blade whereby the angle of incidence of each blade is simultaneously varied by aerodynamic action.

8. An airplane including a fuselage, a rotatable unit, bearings on the unit, the axis of said bearings extending transversely with respect to the axis of rotation of the unit, a free and unrestrictedly oscillatable spar carried in said bearings, and a pair of wings rigidly mounted on said spar on opposite sides of said axis of rotation with the axis of the bearings extending longitudinally of the wings but out of registry with the respective centers of pressure thereof, whereby under aerodynamic action the wings rotate bodily about the axis of rotation of the unit and oscillate the spar to vary the angles of incidence of the respective wings to equalize the effective lift thereof.

In testimony whereof we affix our signatures.

WALTER RIESELER.
WALTER KREISER.